United States Patent Office 3,378,511
Patented Apr. 16, 1968

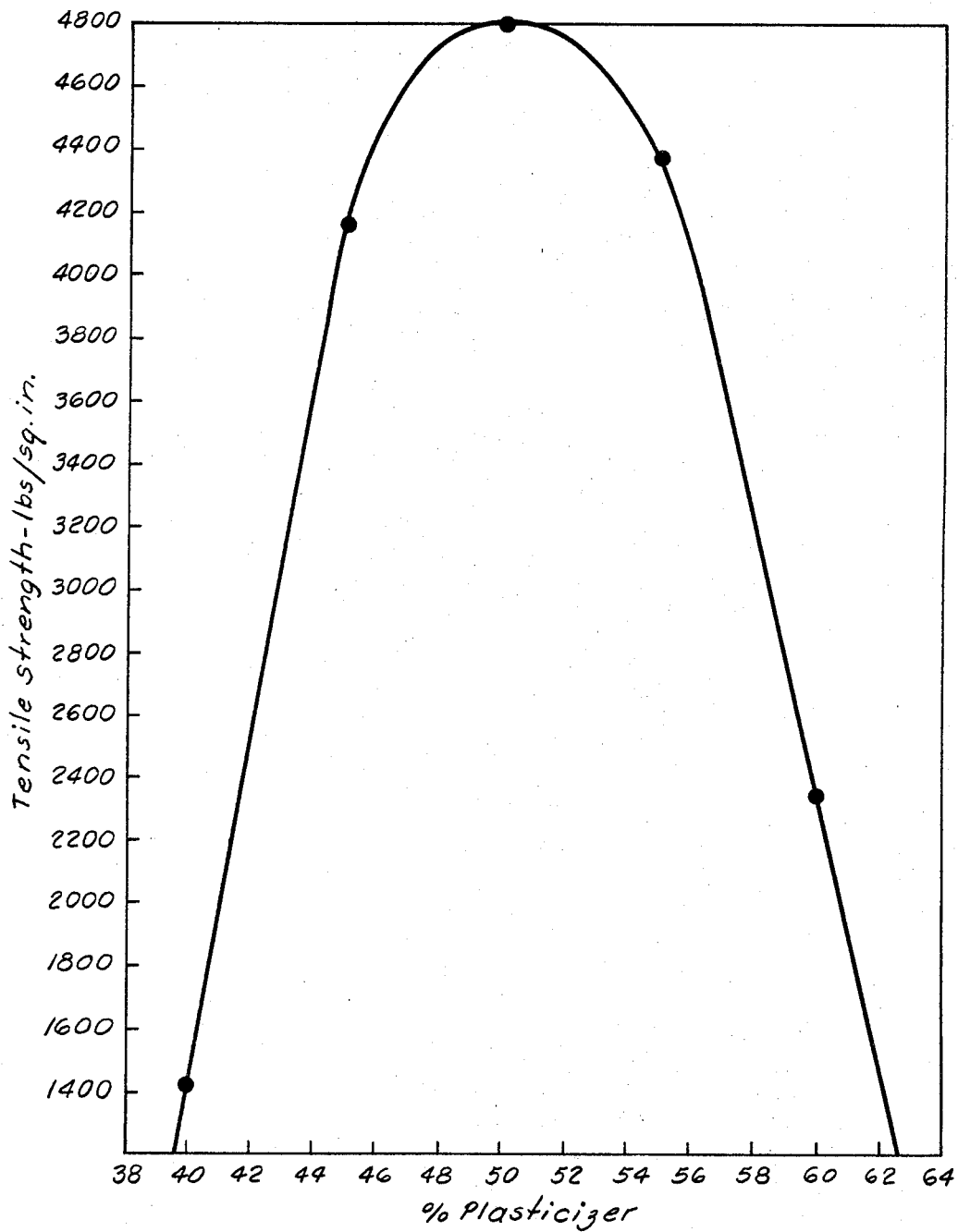

3,378,511
POLYMERIC URETHANE COMPOSITIONS
Harold Gene Newton, Lake Jackson, Tex., assignor to The Dow Chemical Company, Midland, Mich., a corporation of Delaware
Filed Jan. 15, 1965, Ser. No. 425,892
8 Claims. (Cl. 260—31.8)

ABSTRACT OF THE DISCLOSURE

Compositions comprising the reaction product of a polyisocyanate polyether and a polyol that is the adduct of a polyhydric alcohol having from 3 to 8 hydroxyl groups in the molecule and from 1 to 1.33 moles of propylene oxide per OH group and an ester of a dicarboxylic acid having from 2 to 20 carbon atoms, the ester being employed in amounts of from 40 to 60 percent by weight of the composition.

---

This invention concerns new urethane polymer compositions and pertains to a method of making the same. It relates more particularly to a process for preparing polyurethane casting compositions and the solid polymeric products prepared thereby.

U.S. Patent No. 3,102,875 discloses polyurethane reaction products prepared, for example, by reaction of a polyisocyanate with a polyether polyol, and teaches that the reaction products can be formed in, or mixed with, a non-reactive solid or liquid such as dibutyl phthalate, dibutyl sebacate, chlorinated diphenyl etc., and that the plasticized polymers vary from soft resinous gels to hard brittle solids.

It has now been discovered that tough, hard, dense, solid, bubble-free, polymeric urethane products can readily be prepared by the "one-shot" technique of reacting a polyether polyol that is the condensate of propylene oxide in a ratio of from 1 to 1.33 moles of propylene oxide per OH group, with a polyhydric aliphatic compound having from 3 to 8 OH groups, and a polyisocyanate in amount approximately that theoretically required to react with the reactive hydrogens in said condensate, while having the reactants in admixture with a compound selected from the group consisting of diheptyl phthalate, dioctyl phthalate, dioctyl azealate, dioctyl sebacate, di(2-ethylhexyl)adipate, di(2-ethylhexyl)phthalate, and mixtures of any two or more of such compounds, and a catalyst for initiating the polyurethane reaction.

Suitable polyether polyols to be employed in making the new urethane polymer compositions of the invention are the condensates of propylene oxide with an aliphatic polyhydric compound selected from the group consisting of alcohols and polysachharides containing from 3 to 8 OH groups in the molecule, in amounts corresponding to from 3 to 4 moles of the propylene oxide for each 3 OH groups in the aliphatic polyhydric compound. More specifically, the adducts of propylene oxide with glycerine, trimethylolpropane, pentaerythritol, sorbitol, mannitol, or sucrose can be used.

The liquid plasticizers can be one or more of the esters prepared by condensing a 2 to 20 carbon atom dicarboxylic acid or the anhydrides of such acids with an aliphatic alcohol having from 7 to 20 carbon atoms in the molecule. Suitable plasticizers are dioctyl phthalate, diheptyl phthalate, dioctyl azealate, dioctyl sebacate, di(2-ethylhexyl)adipate and di(2-ethylhexyl)phthalate.

The ingredients, i.e. the polyether polyol and the plasticizer are employed in proportions corresponding to from about 40 to 60, preferably 43 to 58, percent by weight of the polyether polyol and correspondingly from about 60 to 40, preferably 57–42, percent by weight of the plasticizer.

The polyisocyanate can be tolylene diisocyanate, diphenylmethane-4,4'-diisocyanate, 2,4-tolylene diisocyanate dimer, triphenylmethyl triisocyanate, dianisidine diisocyanate, or "PAPI" (polymethylene polyphenylisocyanate).

The polyisocyanate is usually employed in amount corresponding to a stoichiometric proportion of NCO groups for each OH group in the polyether polyol starting material, although a proportion slightly less, or greater, than a stoichiometric amount, e.g. from about 0.85 to 1.15 NCO equivalent for each OH group, can be used.

The catalyst can be an organo tin compound such as stannous octoate or stannous laurate, or an amine compound such as triethylenediamine, tetramethyl butane diamine or triethyl amine, and is used in an amount of from about 0.5 to 3.0 percent by weight based on the sum of the weights of the polyether polyol and the plasticizer starting materials, depending upon the particular catalyst employed.

In the practice the polyol, the plasticizer and the catalyst are mixed together in a suitable vessel. To this mixture there is added the polyisocyanate. The resulting mixture is stirred to blend rapidly the ingredients with one another. The mixture reacts immediately after a period of about ten seconds and form a rigid, hard, solid, opaque, glossy, product which can be cut or sawed or machined. In making moldings of the product, it is important that the liquid mixture be poured into the mold at once in order to avoid its setting to a rigid solid even in the midst of its being poured. The product is useful for making articles such blocks, dominoes, mah-jongg pieces, gears, structural members, electrical insulators, capacitors, non-conducting coatings, boxes, containers and the like. The product has the hand of synthetic ivory and varies in appearance from white to black, depending upon the particular polyol and polyisocyanate employed.

The following examples illustrate ways in which the principle of the invention has been applied, but are not to be construed as limiting its scope.

EXAMPLE 1

In each of a series of experiments, a mixture of dioctyl phthalate, and tris-(hydroxypropyl)glycerine, (a polyether polyol prepared by reacting propylene oxide with glycerine in the presence of an alkaline catalyst to form an adduct having an average molecular weight of 260) in proportions as stated in the following table, together with one percent by weight, based on the weight of the mixture, of stannous octoate as catalyst was placed in a one liter paper cup. To the mixture there was added tolylene diisocyanate (80% 2,4 isomer; 20% 2,6 isomer) in amount as stated in the table. The resulting mixture was stirred vigorously for 5 seconds, then was allowed to react. A vigorous exothermic reaction occurred. There was obtained an opaque white, hard, tough, dense product. It could be sawed or machined to form shaped articles or shaped articles could be formed by pouring the blended components into a suitable mold before the components set up.

Test pieces of ½ x ½ inch cross section were machined from the cast product. These test pieces were used to determine the tensile strength of the product employing a procedure similar to that described in ASTM D638–59T. Impact strength was determined by procedure similar to that described in ASTM D256–59T. Table I identifies the experiments and gives the proportions of dioctyl phthalate and tris(hydroxypropyl)glycerine used in preparing the same. The table also gives the tensile strength and notched impact strength values determined for the product.

TABLE I

| Run No. | Starting Materials | | | Product | |
|---|---|---|---|---|---|
| | Polyether Polyol parts | Dioctyl Phthalate parts | Tolylene Diisocyanate parts | Tensile Strength, lbs./sq. in. | Impact Strength, ft.-lbs. |
| 1 | 40 | 60 | 41.2 | 1,427 | 0.63 |
| 2 | 45 | 55 | 46.3 | 4,164 | 1.2 |
| 3 | 50 | 50 | 51.5 | 4,792 | 1.3 |
| 4 | 55 | 45 | 56.6 | 4,379 | 1.0 |
| 5 | 60 | 40 | 61.8 | 2,347 | 0.8 |

The drawing is a graph of the tensile strength versus the percent of plasticizer in the composition.

EXAMPLE 2

In each of a series of experiments, a mixture of equal parts by weight of tris(hydroxypropyl)glycerine and a plasticizer as identified in the following table, together with one percent by weight, based on the weight of the mixture, of stannous octoate as catalyst was mixed with tolylene diisocyanate and allowed to react. Table II identifies the experiments and gives the proportions of the starting materials employed to make the product. The table also gives a tensile strength value determined for the product.

TABLE II

| Run No. | Starting Materials | | | Product, Tensile Strength, lbs./sq. in. |
|---|---|---|---|---|
| | Polyether parts | Kind | Parts | |
| 1 | 50 | Di(2-ethylhexyl)phthalate | 50 | 4,367 |
| 2 | 50 | Di(2-ethylhexyl)adipate | 50 | 3,741 |
| 3 | 50 | Dioctyl sebacate | 50 | 3,484 |
| 4 | 50 | Dioctyl azealate | 50 | 3,356 |
| 5 | 50 | Diheptyl phthalate | 50 | 3,492 |

I claim:

1. A composition of matter comprising the reaction product of a polyisocyanate and a polyether polyol that is the reaction product of a polyhydric alcohol containing from 3 to 8 hydroxyl groups in the molecule and propylene oxide in amount corresponding to from 1 to 1.33 moles of propylene oxide per hydroxyl group in the alcohol in admixture with a plasticizer consisting of an ester selected from the group consisting of a 2 to 20 carbon atom dicarboxylic acid and anhydrides thereof and an aliphatic alcohol having from 7 to 20 carbon atoms, in amount corresponding to from 40 to 60 percent by weight of the sum of the weights of the polyol and the plasticizer.

2. A composition of matter comprising the reaction product of a polyisocyanate and a polyether polyol that is the reaction product of a polyhydric alcohol containing from 3 to 8 OH groups in the molecule and propylene oxide in amount corresponding to from 1 to 1.33 moles of propylene oxide per OH group in the alcohol in admixture with a plasticizer selected from the group consisting of diheptyl phthalate, dioctyl phthalate, dioctyl azealate, dioctyl sebacate, di(2-ethylhexyl)adipate, di(2-ethylhexyl)phthalate and mixtures thereof, in amount corresponding to from 40 to 60 percent by weight of the sum of the weights of the polyol and the plasticizer.

3. A composition as claimed in claim 2 wherein the polyether polyol is the reaction product of propylene oxide and glycerine.

4. A composition as claimed in claim 2 wherein the plasticizer is dioctyl phthalate.

5. A composition as claimed in claim 2 wherein the polyol and the plasticizer are employed in approximately equal proportions by weight.

6. A composition as claimed in claim 2 wherein the polyisocyanate is tolylene diisocyanate.

7. A composition comprising the reaction product of a mixture of (1) from 40 to 60 percent by weight of a polyether polyol that is the reaction product of propylene oxide with glycerine in amounts corresponding to from 3 to 4 moles of propylene oxide per mole of glycerine, and (2) from 60 to 40 percent by weight of dioctyl phthalate, and an approximately chemically equivalent proportion of tolylene diisocyanate.

8. A composition as claimed in claim 7 wherein the polyol and the dioctyl phthalate are each used in an amount of about 50 percent by weight.

References Cited

UNITED STATES PATENTS

| 3,075,928 | 1/1963 | Lanham | 260—31.8 |
| 3,102,875 | 9/1963 | Heiss | 260—31.8 |
| 3,075,927 | 1/1963 | Lanham | 260—31.8 |
| 3,076,770 | 2/1963 | Sanders | 260—31.8 |

JULIUS FROME, *Primary Examiner.*